US012607535B2

(12) United States Patent
Asher

(10) Patent No.: US 12,607,535 B2
(45) Date of Patent: Apr. 21, 2026

(54) APPARATUS FOR DETECTING LEAKAGE OF A GAS AND A METHOD AND A SYSTEM THEREOF

(71) Applicant: UPL Limited, Mumbai (IN)

(72) Inventor: Pushpaksen P. Asher, Vapi (IN)

(73) Assignee: UPL LIMITED, Mumbai (IN)

( * ) Notice: Subject to any disclaimer, the term of this patent is extended or adjusted under 35 U.S.C. 154(b) by 372 days.

(21) Appl. No.: 18/168,692

(22) Filed: Feb. 14, 2023

(65) Prior Publication Data

US 2023/0266194 A1 Aug. 24, 2023

(30) Foreign Application Priority Data

Feb. 18, 2022 (IN) .............................. 202221008699

(51) Int. Cl.
*G01M 3/04* (2006.01)
(52) U.S. Cl.
CPC ..................................... *G01M 3/04* (2013.01)
(58) Field of Classification Search
CPC ........ G01M 3/04; G01M 3/229; G01M 3/186; G01M 3/32
See application file for complete search history.

(56) References Cited

U.S. PATENT DOCUMENTS 6,450,012 B1 * 9/2002 Mayer ................... G01M 3/227
73/49.3
2016/0139096 A1 * 5/2016 Glennon .............. G01N 33/006
250/341.1

FOREIGN PATENT DOCUMENTS

DE 4038266 A1 * 6/1992

OTHER PUBLICATIONS

English Machine Translation of DE 4038266 A1 (Year: 1992).*

* cited by examiner

*Primary Examiner* — David Z Huang
(74) *Attorney, Agent, or Firm* — CANTOR COLBURN LLP

(57) ABSTRACT
Described herein is an apparatus for detecting leakage of an emanated gas from an inorganic compound stored in a container. The apparatus includes an enclosure structured to conceal a closure secured to the container. A flow creation device is fluidically connected to the enclosure, the flow creation device is configured to create a flow of the emanated gas from the enclosure. Further, a gas monitoring unit is fluidically connected between the enclosure and the flow creation device. The gas monitoring unit is structured to receive at least a portion of the emanated gas from the enclosure and detect concentration of at least one constituent present in the emanated gas. The disclosure also includes a system incorporating a control unit for detecting leakage of an emanated gas from an inorganic compound stored in a container.

10 Claims, 3 Drawing Sheets

APPARATUS FOR DETECTING LEAKAGE OF A GAS AND A METHOD AND A SYSTEM THEREOF

CROSS-REFERENCE TO RELATED APPLICATIONS

This application claims priority to U.S. Indian Application 202221008699 filed on Feb. 18, 2022, which is incorporated herein by reference in its entirety.

TECHNICAL FIELD

The present disclosure generally relates to detection equipment. Particularly, but not exclusively, the present disclosure relates to detecting leakage of a gas emanating from an inorganic compound. Further, embodiments of the disclosure disclose an apparatus, a system, and a method for detecting the leakage of the gas emanating from an inorganic compound stored in a container based on the concentration of the emanated gas.

BACKGROUND

Inorganic compounds such as metal phosphides are highly toxic substances generally used in applications such as a fumigants to disinfect agricultural produce such as grains and other essential commodities. One such metal phosphide is aluminium phosphide (AlP), which is generally sold as a powder or in other convenient forms such as tablets, pellets, and the like. Phosphine (PH3) gas is emitted from the metal phosphides, either in technical form or in formulation, on reaction with atmospheric moisture. Phosphine gas is very toxic and, in all cases, must be avoided from exposure or inhalation beyond a Threshold Limit Value (TLV) as recommended by safety agencies to which a person can be exposed for lifetime without affecting his/her health condition. In order to prevent direct exposure or inhalation of phosphine gas, the metal phosphides, either in technical form or in formulation, is generally packed in containers such as aluminium flasks or containers containing sealed caps or covers. The integrity of the seal is very important, and each flask must be checked to ensure no gas leaks from the container. This is done to ensure safety of the personnel at the time of using the product, as well as during transportation, loading/unloading and storage. The recommended TLV for the phosphine gas may vary from region to region. In some countries, the recommended TLV of the phosphine gas is 0.3 ppm, while in some other countries, a TLV of up to 0.1 ppm is strictly mandated.

To ensure safe exposure of phosphine gas well within mandated TLV, it is necessary to identify the extent of leakage. Leakages may be detected by various known techniques which serve as effective means for assessing the qualitative and quantitative extents of the toxic constituents, for e.g., the phosphine gas in case of AlP. One such technique involves checking phosphine gas concentration in its storage box using any conventionally known gas concentration measuring device. However, checking each and every storage container to identify a possible leakage is a tedious and time-consuming task. Therefore, there exists a need for a simple, quick, accurate, less expensive device for detecting leakage in a leaky flask containing a toxic gas such as phosphine.

The present disclosure is intended to overcome one or more above stated limitations.

SUMMARY

One or more shortcomings of the conventional leakage detection apparatus, systems and methods are overcome, and additional advantages are provided through the present disclosure. Additional features and advantages are realized through the techniques of the present disclosure. Other embodiments and aspects of the disclosure are described in detail herein and are considered a part of the claimed disclosure.

In one non-limiting embodiment of the present disclosure, an apparatus for detecting leakage of an emanated gas from an inorganic compound stored in a container is disclosed. The apparatus includes an enclosure structured to conceal a closure secured to the container. The apparatus further includes a flow creation device which is fluidically connected to the enclosure. The flow creation device is configured to create a flow of the emanated gas from the enclosure. Further, a gas monitoring unit is fluidically connected between the enclosure and the flow creation device. The gas monitoring unit is structured to receive at least a portion of the emanated gas from the enclosure and detect concentration of at least one constituent present in the emanated gas.

In an embodiment, the enclosure is secured to an upper body portion of the container enclosing the closure.

In an embodiment, a sealing member is provided between the enclosure and the container.

In an embodiment, the enclosure is open to an air source through a first valve.

In an embodiment, the flow creation device is a vacuum pump, and the vacuum pump is configured to apply vacuum inside the enclosure to create the flow of the emanated gas.

In an embodiment, a pressure gauge is coupled between the flow creation device and the enclosure, where the pressure gauge is configured to indicate pressure of the vacuum applied inside the enclosure.

In an embodiment, a second valve is coupled between the flow creation device and the enclosure, where the second valve is configured to selectively allow flow of the emanated gas from the enclosure.

In an embodiment, a third valve is coupled to an inlet of the gas monitoring unit, where the third valve is configured to selectively allow the flow of at least a portion of the emanated gas from the enclosure to the gas monitoring unit.

In an embodiment, the inorganic compound is aluminium phosphide, magnesium phosphide, calcium phosphide, or other metal phosphides., and the emanated gas is phosphine.

In an embodiment, a method for detecting leakage of an emanated gas from an inorganic compound stored in a container is disclosed. The method includes positioning an enclosure to conceal a closure secured to the container. Then, the method includes opening a second valve positioned between a flow creation device and the enclosure. Further, the method includes operating the flow creation device to create flow of the emanated gas from the enclosure, followed by opening a first valve and a third valve to direct a portion of the emanated gas towards a gas monitoring unit. The gas monitoring unit is structured to measure concentration of the at least one constituent present in the emanated gas.

In an embodiment, opening the first valve and the second valve releases vacuum applied inside the enclosure.

In an embodiment, pressure of the vacuum inside the enclosure ranges from (−6100) to (−7900) mm of water.

In another non-limiting embodiment, a system for detecting leakage of an emanated gas from an inorganic compound stored in a container is disclosed. The system includes an apparatus having an enclosure structured to conceal a closure secured to the container. A flow creation device is fluidically connected to the enclosure, the flow creation device configured to create a flow of the emanated gas from the enclosure. Further, a gas monitoring unit is fluidically connected between the enclosure and the flow creation device. The gas monitoring unit is structured to receive at least a portion of the emanated gas from the enclosure and detect concentration of at least one constituent present in the emanated gas. Further, the system includes a control unit communicatively coupled to a flow creation device, a first valve, a second valve, a third valve and the gas monitoring unit. The control unit is configured to selectively operate the flow creation device, the first valve, the second valve and the third valve to direct at least a portion of emanated gas to the gas monitoring unit. Then, the control unit indicates the concentration of the at least one constituent present in the emanated gas based on signals received from the gas monitoring unit.

In an embodiment, the system includes a display unit communicatively coupled to the control unit and control unit indicates the concentration of the at least one constituent through the display unit.

The foregoing summary is illustrative only and is not intended to be in any way limiting. In addition to the illustrative aspects, embodiments, and features described above, further aspects, embodiments, and features will become apparent by reference to the drawings and the following description.

BRIEF DESCRIPTION OF ACCOMPANYING DRAWINGS

The novel features and characteristics of the disclosure are set forth in the appended description. The disclosure itself, however, as well as a preferred mode of use, further objectives, and advantages thereof, will best be understood by reference to the following description of an illustrative embodiment when read in conjunction with the accompanying drawings. One or more embodiments are now described, by way of example only, with reference to the accompanying drawings wherein like reference numerals represent like elements and in which.

Figure 1:
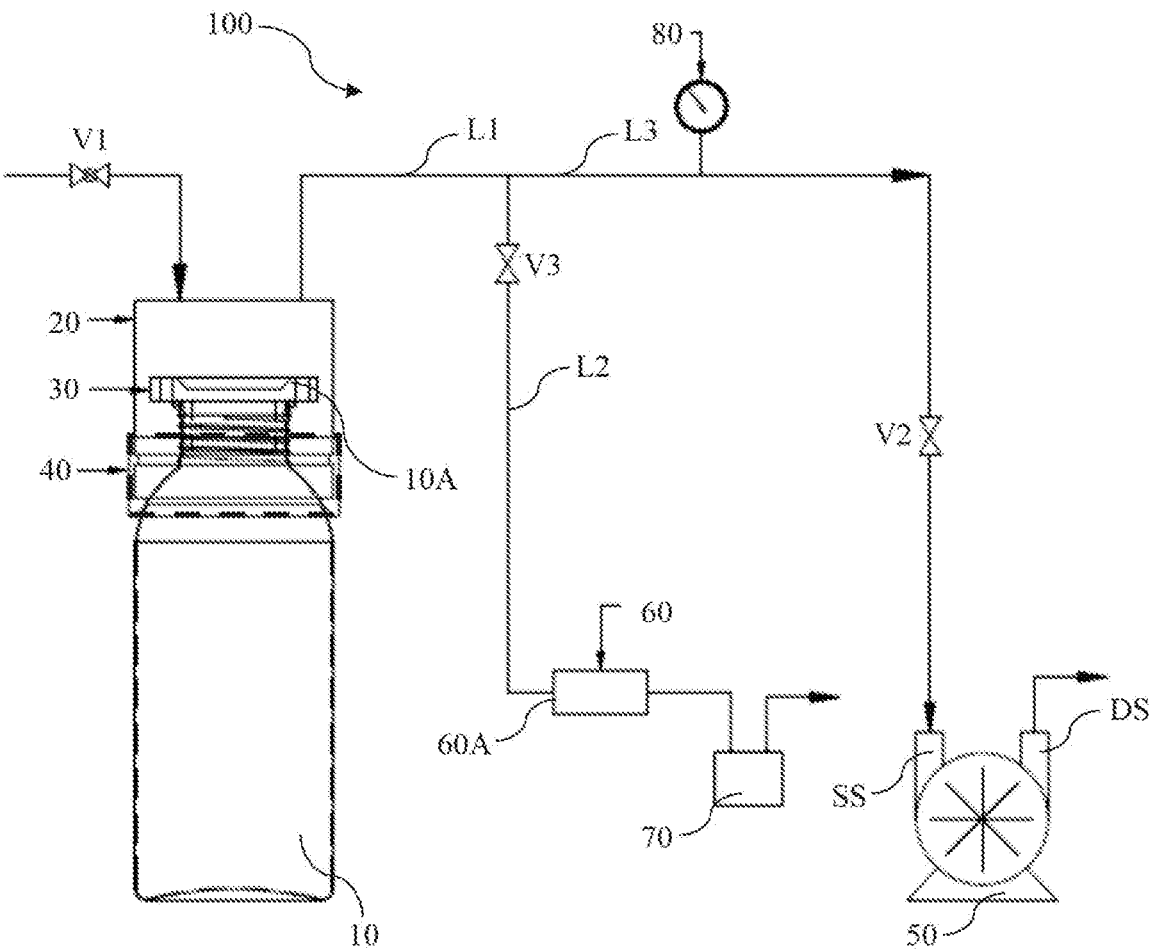
FIG. 1 illustrates a schematic view of the apparatus for detecting leakage of an emanated gas from an inorganic compound, in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

While the embodiments of the disclosure are subject to various modifications and alternative forms, specific embodiments thereof have been shown by way of example in the figures and will be described below. It should be understood, however, that it is not intended to limit the disclosure to the particular forms disclosed, but on the contrary, the disclosure is to cover all modifications, equivalents, and alternatives falling within the scope of the disclosure.

It is to be noted that a person skilled in the art would be motivated from the present disclosure and modify configuration of the apparatus of the present disclosure for the purpose of detecting leakage of a gas in a container or a flask. However, such modification(s) should be construed within the scope of the instant disclosure. Accordingly, the drawings show only those specific details that are pertinent to understand the embodiments of the present disclosure so as not to obscure the disclosure with details that will be readily apparent to those of ordinary skill in the art having benefit of the description herein.

The terms "comprises", "comprising", or any other variations thereof used in the disclosure, are intended to cover a non-exclusive inclusions, such that an apparatus, that comprises a list of components does not include only those components but may include other components not expressly listed or inherent to such an apparatus. In other words, one or more elements in an apparatus or a system preceded by "comprises . . . a" does not, without more constraints, preclude the existence of other elements or additional elements in the apparatus or the system.

In the following description of the embodiments of the disclosure, reference is made to the accompanying figures that form a part hereof, and in which are shown, by way of illustration, specific embodiments in which the disclosure may be practiced. These embodiments are described in sufficient detail to enable those skilled in the art to practice the disclosure, and it is to be understood that other embodiments may be utilized and that, changes may be made without departing from the scope of the present disclosure. The following description is, therefore, not to be taken in a limiting sense.

Embodiments of the present disclosure discloses an apparatus for detecting leakage of an emanated gas from an inorganic compound stored in a container. The apparatus includes an enclosure structured to conceal a closure secured to the container, there is a flow creation device which is fluidically connected to the enclosure. The flow creation device is configured to create a flow of the emanated gas from the enclosure. Further, the apparatus includes a gas monitoring unit which is fluidically connected between the enclosure and the flow creation device. The gas monitoring unit is structured to receive at least a portion of the emanated gas from the enclosure and detect concentration of at least one constituent present in the emanated gas. The device of the present disclosure, apart from providing reliable and accurate results allows ready detection of leakage in a leaky flask to prevent potential hazards.

FIG. 1 illustrates an apparatus (100) for detecting leakage of an emanated gas from an inorganic compound stored in a container (10), in accordance with some exemplary embodiments of the disclosure. Leakage of certain toxic gases such as phosphine emanating from solid phases (or formulations) of an inorganic compound, such as metal phosphides, are detrimental to the health and life of personnel. In an embodiment, the metal phosphides include, but are not limited to aluminium phosphide, magnesium phosphide, calcium phosphide, and the like. To prevent exposure to such toxic gases, such inorganic compounds (or formulations) may be stored in a protective container (10) as shown in FIG. 1. The container (10), as shown, may be in the form of a flask or a cylinder with inner provisions [not shown] to hold the metal phosphide formulation, including but not limited to an aluminum phosphide formulation, a magnesium phosphide formulation, or a calcium phosphide formulation [not shown]. The container (10) may have an opening (10A) for placing and removing the formulation. In an embodiment, the opening (10A) may be closed or sealed by a closure (30), such as a cap or lid. In an embodiment, the lid may be a threaded lid with corresponding matching threads that is provided in an upper portion of the container (10) to receive the lid. The apparatus (100) includes an enclosure (20) which conceals the closure (30) secured to the container (10). In an embodiment, the closure (30) is secured to the container (10) through processes such as but not limited to mechanical fastening means. The enclosure (20), as shown in FIG. 1, may form an envelope or a chamber around the closure (30), such that when there is leakage from any portion in the vicinity of the opening (10A) or the closure (30), the leaking fluids such as toxic gases may be confined or bounded within the enclosure (20). In an embodiment, the enclosure (20) may be secured to the container (10) through a sealing member (40) [indicated by dashed lines] to ensure a fluid tight joint.

In another embodiment, the enclosure (20) may be in fluid communication with an air source [not shown] via a first valve (V1), as shown. In an embodiment, the air source may be atmospheric air, where the enclosure (20) is directly open or exposed to atmosphere via the first valve (V1). When the valve (V1) is opened, atmospheric air or air from any other air sources may be let into the enclosure (2) for effecting flow, as well as altering pressure of the fluids present in the enclosure (20). In an embodiment of the disclosure, the inorganic compound is a metal phosphide such as aluminium phosphide (AlP), magnesium phosphide (MgP), calcium phosphide (CaP), etc., and the fluids [gases] emanating from the inorganic compound is phosphine (PH3), particularly when these metal phosphides come in contact with moisture.

Referring again to FIG. 1, it can be seen that the enclosure (20) may be in fluid communication with a flow creation device (50) through a second valve (V2). A pressure gauge (80) may be provided between the valve V2 and enclosure (20). The flow creation device (50) may be configured to create a flow of the emanated gas from the enclosure (20). To facilitate the flow, the flow creation device (50) may create a pressure difference [gradient] by application of pressure inside the enclosure (20). In an embodiment, the flow creation device (50) may be a vacuum pump which may apply vacuum (or suction pressure) inside the enclosure (20). The application of vacuum (suction) inside the enclosure (20) may compel or drive the fluids i.e., the emanated gas to flow or move out of the enclosure (20) through fluid line L1. The second valve (V2) may allow or restrict the application of vacuum (suction pressure) inside the enclosure (20) by the vacuum pump. Further, the pressure gauge (80) may give an indication of the magnitude of applied vacuum (suction) pressure inside the enclosure (20). In an embodiment, the flow creation device (50) may have a suction side (SS) for creating vacuum or suction pressure through the second valve (V2), and a delivery side (DS).

The apparatus (100) shown in FIG. 1 may further include a gas monitoring unit (60) which may be connected between the container (10) and the flow creation device (50). The gas monitoring unit (60) may be placed in the branched flow line (L2) and may contain a third valve (V3) in the same flow line (L2). The third valve (V3) may selectively allow flow of at least a portion of the emanated gas into the gas monitoring unit (60). In an embodiment, the gas monitoring unit (60) may have an inlet (60A) coupled to the third valve (V3). The gas monitoring unit (60) may receive at least a portion of the emanated gas via the inlet (60A).

Now, referring back to FIG. 1, a method embodiment for detecting leakage of the emanated gas from the inorganic compound using the apparatus (100) is disclosed. The method includes positioning the enclosure (20) to conceal a closure (30) secured to the container (10). This is followed by opening the second valve (V2) placed between the flow creation device (50) and the enclosure (20), so that the flow creation device (50) may create a flow of the emanated gas from the enclosure (20). In an embodiment where the flow creation device (50) is a vacuum pump, vacuum (suction) pressure is applied in the enclosure (20). Application of vacuum (suction) compel the emanated gas present in the enclosure (20) to flow or move out of the enclosure (20) into the line (L1). In an embodiment, the applied vacuum (suction) pressure ranges from (−6100) to (−7900) mm of water. Application of vacuum continues until the desired range of vacuum pressure i.e., (−6100) to (−7900) mm of water is attained. Once the desired vacuum pressure is reached, the first valve (V1) and the third valve (V3) which otherwise remain closed are opened. Opening of first and third valves (V1, V3) may release the vacuum applied to the enclosure (20) in the previous step, so that at least a portion of the emanated gas is driven or forced into the gas monitoring unit (60) via the third valve (V3). The gas monitoring unit (60) measures the concentration of the emanated gas entirely, or the concentration of at least one constituent present in the emanated gas. Based on measurement of the concentration, whether or not the container (10) having the enclosure (20) is leaky or non-leaky may be ascertained.

Figure 2:
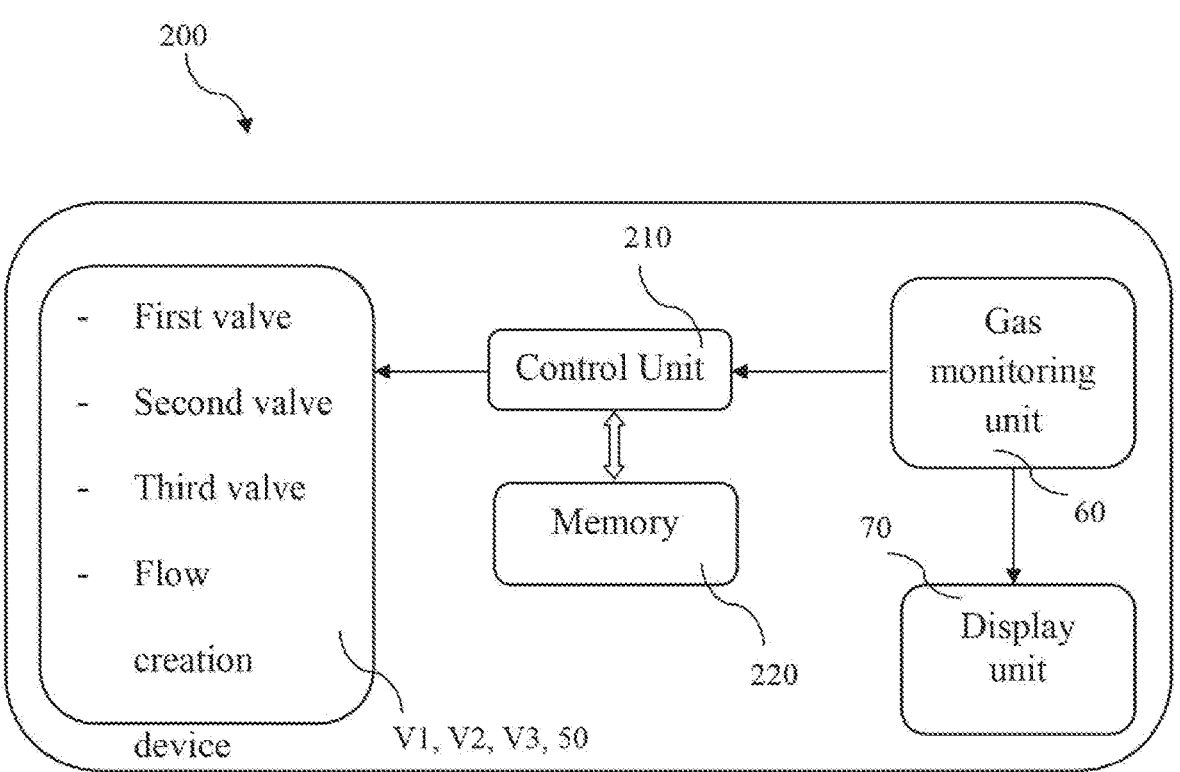
FIG. 2 illustrates a schematic block diagram of a system containing the apparatus of FIG. 1 along with a control unit, in accordance with some embodiment of the present disclosure.

FIG. 2 illustrates a schematic block diagram of a system (200) having the apparatus (100) shown in FIG. 1, according to an embodiment of the disclosure. The system (200) includes a control unit (210) communicatively coupled to the flow creation device (50), the first valve (V1), the second valve (V2), the third valve (V3) and the gas monitoring unit (60) present in the apparatus (100). In an embodiment, the first valve (V1), the second valve (V2) and the third valve (V3) is a flow control valve but not limited to the same. The control unit (210) may selectively operate the flow creation device (50), the first valve (V1), the second valve (V2), the third valve (V3) to direct at least a portion of the emanated gas into the gas monitoring unit (60). The control unit (210) may then give an indication of the concentration of the at least one constituent present in the emanated gas based on signals received from the gas monitoring unit (60). In an embodiment, the system (200) may include a display unit (70) associated with the gas monitoring unit (60) to display the concentration of the emanated gas or at least one constituent of the emanated gas measured by the gas monitoring unit (60). The display unit (70) is communicatively coupled to the control unit (210). The display unit (70) may be a monitor or any other display unit. The presence of the display unit (70) may be beneficial in gauging the extent of leakage from the container (10). In an embodiment, the control unit (210) regulates open-close cycles of each of the first, second and third valves (V1, V2, and V3) as well as timing of opening-closing of the first, second and third valves (V1, V2, and V3). Further, the control unit (210) regulates the operation of the flow creation device (50), which is a vacuum pump, until desired vacuum levels in the enclosure (20) is attained. The control unit (210) is also interfaced with a memory unit (220) for the purpose of retrieving stored instructions/sequence of commands, as well as to store the generated results for further use.

Figure 3:
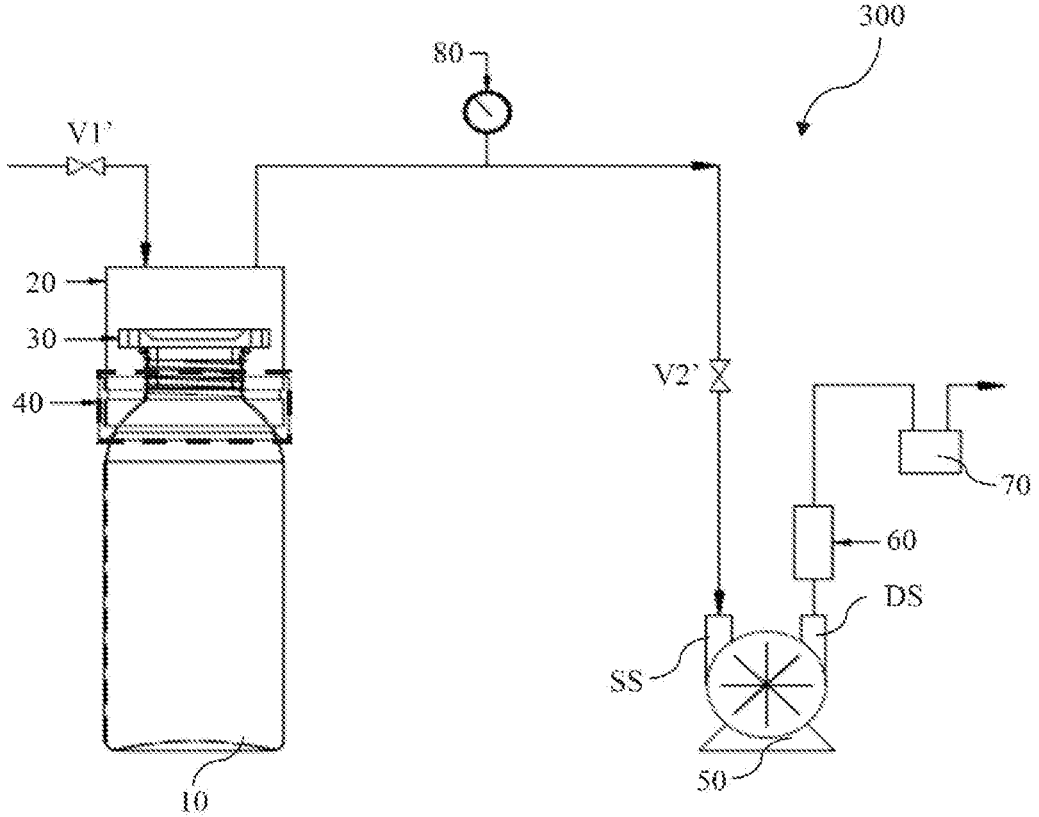
FIG. 3 illustrates a schematic view of another configuration of the apparatus for detecting leakage of an emanated gas from an inorganic compound, in accordance with an embodiment of the present disclosure.

FIG. 3 illustrates a schematic of an apparatus (300) for detecting leakage of an emanated gas from an inorganic compound stored in a container (10) in accordance with another exemplary embodiment of the disclosure. The apparatus (300), as shown, has the gas monitoring unit (60) connected to delivery side (DS) of the flow creation device (50). The apparatus (300) also includes an enclosure (20) structured to conceal a closure (30) secured to the container (10). In an embodiment, the enclosure (20) is secured to the container (10) through a sealing member (40) [indicated by dashed lines] to ensure a fluid tight connectivity. A flow creation device (50), such as a vacuum pump (50), is connected to the enclosure (20). The flow creation device (50) is configured to create a flow of the emanated gas from the enclosure (20). Further, a gas monitoring unit (60) is connected downstream of a delivery side (DS) of the flow creation device (50) along with a display unit (70). The gas monitoring unit (60) receives at least a portion of the emanated gas from the enclosure (20) through the flow creation device (50) to detect concentration of at least one constituent present in the emanated gas. A first valve (V1') is used to connect the enclosure (20) to an air source, such as atmospheric air, and a second valve (V2') is placed between a suction side (SS) of the flow creation device (50) and the enclosure (20). In operation, the first valve (V1') is closed so that no air enters or exits the enclosure. This is followed by creating the flow of the emanated gas by the flow creation device (50), which is application of vacuum (suction) pressure inside the enclosure (20). The second valve (V2') is kept open during the application of vacuum pressure. In an embodiment, the applied vacuum (suction) pressure ranges from (−6100) to (−7900) mm of water. Once desired flow (vacuum pressure) is attained inside the enclosure (20), the first valve (V1') is opened so as to compel or drive the emanated gas towards the suction side (SS) of the flow creation device (50). The applied vacuum (suction) pressure and associated variations is indicated by the pressure gauge (80) placed between the flow creation device (50) and the container (10), as shown. The emanated gas entering the suction side (SS) is conveyed or discharged to the delivery side (DS), and further into the gas monitoring unit (60) to measure the concentration of the emanated gas (or at least one constituent of the emanated gas).

EXAMPLES

Example 1

In an embodiment of the disclosure, findings from an experimental investigation performed using the apparatus (100) described with reference to FIG. 1 of the present disclosure are presented. The experimental investigation demonstrated that a concentration of less than 1 ppm (parts per million) as measured by the gas monitoring unit (60) implicated a non-leaky container (10) or leakage of acceptable level, and a concentration higher than 1 ppm implicated a leaky container (10). This was further validated by separating all the individual containers, which revealed a concentration of less than 1 ppm, and placing them in a sealed box for 24 hours. After the 24-hour time period, the concentration of the emanated gas inside the volume of the sealed box was found to be zero. This demonstrated that none of the containers (10) in the box was leaky. On the other hand, all the containers (10) whose emanated gas concentrations exceeded 1 ppm were grouped, and each container (10) was covered with another leak proof container still remaining sealed. Then, the leak proof container was tested for leakage and confirmation of leakage in that particular container was ascertained.

Table 1 shown below illustrates findings from the experiment conducted using the apparatus (100) of the present disclosure, as discussed in the previous section [example 1]. The experiment involved a total of 1444 leaky and non-leaky containers, with the segregation of non-leaky (<1 ppm) and leaky (>1 ppm) being tabulated in Table 1. Both leaky and non-leaky containers were further tested for validating the results. Out of 1444 containers, a total of 1414 containers showed a concentration <1 ppm [non-leaky containers], and 30 containers showed a concentration of >1 ppm [leaky containers]. The approximate time required for testing and ascertaining whether a container (10) is leaky or non-leaky may be as small as 14-20 seconds.

TABLE 1

RESULTS FROM EXPERIMENTAL INVESTIGATION
OF NON-LEAKY/LEAKY CONTAINERS USING
THE APPARATUS OF THE DISCLOSURE

| Sr. No. | Number of containers (number in each batch) | Test container considered non-leaky ($PH_3$ conc. <1.0 ppm displayed on monitor) | Leaky Flask ($PH_3$ conc. ≥1.0 ppm displayed on monitor) |
|---|---|---|---|
| 1 | 100 | 96 | 4 |
| 2 | 42 | 42 | 0 |
| 3 | 126 | 126 | 0 |
| 4 | 210 | 210 | 0 |
| 5 | 84 | 84 | 0 |
| 6 | 84 | 84 | 0 |
| 7 | 84 | 80 | 4 |
| 8 | 126 | 126 | 0 |
| 9 | 126 | 126 | 0 |
| 10 | 126 | 124 | 2 |
| 11 | 189 | 185 | 4 |
| 12 | 147 | 131 | 16 |
| Total | 1444 | 1414 | 30(*) |

In an embodiment of the present disclosure, time taken for detecting a non-leaky container using the apparatus (100) of the present disclosure is less than or equal to 14 seconds. In a preferred embodiment, the time taken for detecting a non-leaky container using the apparatus (100) of the present disclosure is between 3 to 10 seconds. In a most preferred embodiment, the time taken for detecting a non-leaky container using the apparatus (100) of the present disclosure is between 6 to 8 seconds.

In another embodiment, time taken for detecting a leaky container using the apparatus (100) of the present disclosure is greater than 14 seconds.

Example 2

In an embodiment of the disclosure, the findings from an experimental investigation performed using the apparatus (300) shown in FIG. 3 are presented. The experimental investigation demonstrated d that an indication of the concentration less than 1 ppm (parts per million) implicated a non-leaky container (10), and an indication of concentration higher than 1 ppm implicated a leaky container (10). In an embodiment, the time for testing each flask ranged between 15-30 secs. Table 2 shown below illustrates findings from the experiment. The experiment involved a total of 30 leaky and non-leaky containers, with the segregation of non-leaky (<1 ppm) and leaky (>1 ppm) based on determination of concentration being tabulated in Table 1. Both leaky and non-leaky containers were further tested for validating the results. Out of 30 containers, a total of 21 containers showed a concentration <1 ppm [non-leaky containers], and 9 containers showed a concentration of >1 ppm [leaky containers].

TABLE 2

| RESULTS FROM EXPERIMENTAL INVESTIGATION OF CONTAINERS USING THE APPARATUS OF THE DISCLOSURE | | |
| --- | --- | --- |
| Flask No | Test Flask | PH₃ Conc (ppm) after vacuum release |
| 1 | OK | 0.2 |
| 2 | OK | 0.4 |
| 3 | OK | 0.4 |
| 4 | OK | 0.3 |
| 5 | OK | 0.1 |
| 6 | OK | 0.3 |
| 7 | OK | 0.4 |
| 8 | OK | 0.2 |
| 9 | OK | 0.2 |
| 10 | OK | 0.4 |
| 11 | OK | 0.5 |
| 12 | OK | 0.1 |
| 13 | OK | 0.3 |
| 14 | Leaky | 1.5 |
| 15 | Leaky | 1.0 |
| 16 | OK | 0.6 |
| 17 | OK | 0.2 |
| 18 | Leaky | 1.0 |
| 19 | OK | 0.4 |
| 20 | OK | 0.2 |
| 21 | OK | 0.1 |
| 22 | Leaky | 1.6 |
| 23 | OK | 0.6 |
| 24 | Leaky | 4.5 |
| 25 | Leaky | 2.4 |
| 26 | OK | 0.7 |
| 27 | Leaky | 1.0 |
| 28 | Leaky | 1.2 |
| 29 | Leaky | 1.5 |
| 30 | OK | 0.6 |

In an embodiment of the disclosure, the control unit (210) may be implemented by any computing systems that is utilized to implement the features of the present disclosure. The control unit may comprise a processing unit. The processing unit may comprise at least one data processor for executing program components for executing user- or system-generated requests. The processing unit may be a specialized processing unit such as integrated system (bus) controllers, memory management control units, floating point units, graphics processing units, digital signal processing units, and the like. The processing unit may include a microprocessor, such as AMD Athlon™, Duron™ or Opteron™, ARM's application, embedded or secure processors, IBM Power® PC, Intel®'s Core™, Itanium®, Xeon®, Celeron® or other line of processors, and the like. The processing unit may be implemented using a mainframe, distributed processor, multi-core, parallel, grid, or other architectures. Some embodiments may utilize embedded technologies like application-specific integrated circuits (ASICs), digital signal processors (DSPs), field programmable gate arrays (FPGAs), etc.

In some embodiments, the control unit may be positioned in communication with one or more memory devices (e.g., RAM, ROM etc.) via a storage interface. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computing system interface (SCSI), etc. The memory drives may further include a drum, magnetic disc drive, magneto-optical drive, optical drive, redundant array of independent discs (RAID), solid-state memory devices, solid-state drives, etc.

The apparatus (100, 300) and the system (200) of the present disclosure may have several advantages. One advantage is the simplicity in construction which requires less capital (investment). Another advantage is reduced testing time for each container to ascertain whether a container is leaking or not (~14 seconds using apparatus (100)). This is beneficial when containers are being handled or transported in bulk or large batches.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERENCE NUMERALS

| Part | Numeral |
| --- | --- |
| Apparatus | 100 |
| Container | 10 |
| Opening in the container | 10A |
| Enclosure | 20 |
| Closure/Cap | 30 |
| Sealing member | 40 |
| Flow creation device/vacuum pump | 50 |
| Gas monitoring unit | 60 |
| Inlet of gas monitoring unit | 60A |
| Pressure gauge | 80 |
| First, second and third valves | V1, V2 and V3 |
| Flow lines | L1, L2 and L3 |
| Suction side | SS |
| Delivery side | DS |
| System | 200 |
| Display unit | 70 |
| Control unit | 210 |
| Memory | 220 |
| Modified apparatus | 300 |
| Valves | V1', V2' |

The invention claimed is:

1. An apparatus (100) for detecting leakage of an emanated gas from an inorganic compound stored in a container (10), the apparatus (100) comprising:

an enclosure (20) structured to conceal a closure (30) secured to the container (10);

a flow creation device (50) fluidically connected to the enclosure (20), the flow creation device (50) configured to create flow of the emanated gas from the enclosure (20);

a gas monitoring unit (60) fluidically connected between the enclosure (20) and the flow creation device (50), wherein the gas monitoring unit (60) is structured to receive at least a portion of the emanated gas from the enclosure (20) and detect a concentration of at least one constituent present in the emanated gas;

a third valve (V3) coupled to an inlet (60A) of the gas monitoring unit (60), wherein the third valve (V3) is configured to selectively allow the flow of at least a portion of the emanated gas from the enclosure (20) to the gas monitoring unit (60); and a sealing member (40) disposed between the enclosure (20) and the container (10), wherein the sealing member (40) is configured to provide a hermetic seal to prevent ambient air from entering the enclosure (20) during leakage detection;

a pressure gauge (80) coupled between the flow creation device (50) and the enclosure (20), wherein the pressure gauge (80) is configured to indicate pressure of a vacuum applied inside the enclosure (20);

a display unit (70) configured to indicate the concentration of the at least one constituent present in the emanated gas as measured by the gas monitoring unit (60);

wherein the enclosure (20) is open to an air source through a first valve (V1), and the apparatus further comprises a second valve (V2) coupled between the flow creation device (50) and the enclosure (20), the second valve (V2) being configured to selectively allow flow of the emanated gas from the enclosure (20).

2. The apparatus (100) as claimed in claim 1, wherein the enclosure (20) is secured to an upper body portion of the container (10) enclosing the closure (30).

3. The apparatus as claimed in claim 1, wherein the flow creation device (50) is a vacuum pump, and wherein the vacuum pump is configured to apply vacuum inside the enclosure (20) to create the flow of the emanated gas.

4. The apparatus as claimed in claim 1, wherein the inorganic compound is a metal phosphide.

5. The apparatus as claimed in claim 4, wherein the inorganic compound is a aluminium phosphide (AIP), magnesium phosphide (MgP), or calcium phosphide (CaP), and the emanated gas is phosphine.

6. A method for detecting leakage of an emanated gas from the inorganic compound stored in the container (10) through the apparatus (100) as claimed in claim 1, the method comprising:

positioning the enclosure (20), to conceal the closure (30) secured to the container (10);

disposing the sealing member (40) between the enclosure (20) and the container (10), the sealing member (40) being configured to provide a hermetic seal to prevent ambient air from entering the enclosure (20) during leakage detection;

opening, the second valve (V2) positioned between the flow creation device (50) and the enclosure (20);

operating the flow creation device (50), to create flow of the emanated gas from the enclosure (20);

indicating, by the pressure gauge (80) coupled between the flow creation device (50) and the enclosure (20), the pressure of the vacuum applied inside the enclosure (20);

opening the first valve (V1) and the third valve (V3) to direct at least a portion of the emanated gas towards the gas monitoring unit (60), indicating, by the display unit (70) communicatively coupled to the gas monitoring unit (60), the concentration of the at least one constituent present in the emanated gas as measured by the gas monitoring unit (60);

wherein, the gas monitoring unit (60) is configured to measure concentration of the at least one constituent present in the emanated gas.

7. The method as claimed in claim 6, wherein the flow creation device (50) is a vacuum pump, and wherein operating the flow creation device includes applying vacuum inside the enclosure (20) using the vacuum pump.

8. The method as claimed in claim 6, wherein opening the first valve (V1) and the second valve (V2) releases vacuum applied inside the enclosure (20).

9. The method as claimed in claim 7, wherein pressure of the vacuum inside the enclosure ranges from (−6100) to (−7900) mm of water.

10. A system (200) for detecting leakage of an emanated gas from an inorganic compound stored in a container (10), the system comprising:

an apparatus (100), comprising:

an enclosure (20) structured to conceal a closure (30) secured to the container (10);

a sealing member (40) disposed between the enclosure (20) and the container (10), the sealing member (40) being configured to provide a hermetic seal to prevent ambient air from entering the enclosure (20) during leakage detection;

a flow creation device (50) fluidically connected to the enclosure (20), the flow creation device (50) configured to create a flow of the emanated gas from the enclosure (20); and a gas monitoring unit (60) fluidically connected between the enclosure (20) and the flow creation device (50), the gas monitoring unit (60) is structured to receive at least a portion of the emanated gas from the enclosure (20) and detect concentration of at least one constituent present in the emanated gas;

a pressure gauge (80) coupled between the flow creation device (50) and the enclosure (20), wherein the pressure gauge (80) is configured to indicate pressure of a vacuum applied inside the enclosure (20);

a display unit (70) configured to indicate the concentration of the at least one constituent present in the emanated gas as measured by the gas monitoring unit (60);

wherein the enclosure (20) is open to an air source through a first valve (V1), and the apparatus further comprises a second valve (V2) coupled between the flow creation device (50) and the enclosure (20), the second valve (V2) being configured to selectively allow flow of the emanated gas from the enclosure (20), and, a control unit (210) communicatively coupled to the flow creation device (50), the first valve (V1), the second valve (V2), a third valve (V3) and the gas monitoring unit (60), wherein the control unit (210) is configured to:

selectively operate the flow creation device (50), the first valve (V1), the second valve (V2) and the third valve (V3) to direct at least a portion of emanated gas to the gas monitoring unit (60); and indicate the concentration of the at least one constituent present in the emanated gas based on signals received from the gas monitoring unit (60).

* * * * *